United States Patent [19]

Sheahan

[11] Patent Number: 5,302,457
[45] Date of Patent: Apr. 12, 1994

[54] WEATHERABLE MONOLITHIC COVERINGS

[75] Inventor: James P. Sheahan, Midland, Mich.

[73] Assignee: J. P. Sheahan & Associates, Midland, Mich.

[21] Appl. No.: 801,432

[22] Filed: Dec. 2, 1991

Related U.S. Application Data

[62] Division of Ser. No. 319,105, Mar. 6, 1989, Pat. No. 5,093,171.

[51] Int. Cl.⁵ .............................................. B32B 3/00
[52] U.S. Cl. ................................ 428/411.1; 428/161; 428/172; 428/61
[58] Field of Search .......................... 428/61, 411.1

[56] References Cited

U.S. PATENT DOCUMENTS

| | | | |
|---|---|---|---|
| 4,235,952 | 11/1980 | Holmes et al. | 428/61 |
| 4,908,088 | 3/1990 | Boyd et al. | 428/281 |
| 4,910,059 | 3/1990 | Sancaktar | 428/61 |
| 5,093,171 | 3/1992 | Sheahan | 428/61 |
| 5,122,213 | 6/1992 | Figge, Sr. | 156/222 |

FOREIGN PATENT DOCUMENTS

| | | |
|---|---|---|
| 3002212 | 7/1980 | Fed. Rep. of Germany . |
| 3-026531 | 2/1991 | Japan . |

*Primary Examiner*—P. C. Sluby
*Attorney, Agent, or Firm*—Robert L. McKellar

[57] ABSTRACT

There is disclosed composites which are comprised of thermoplastic materials and thermoset materials which are fused together.

4 Claims, 2 Drawing Sheets

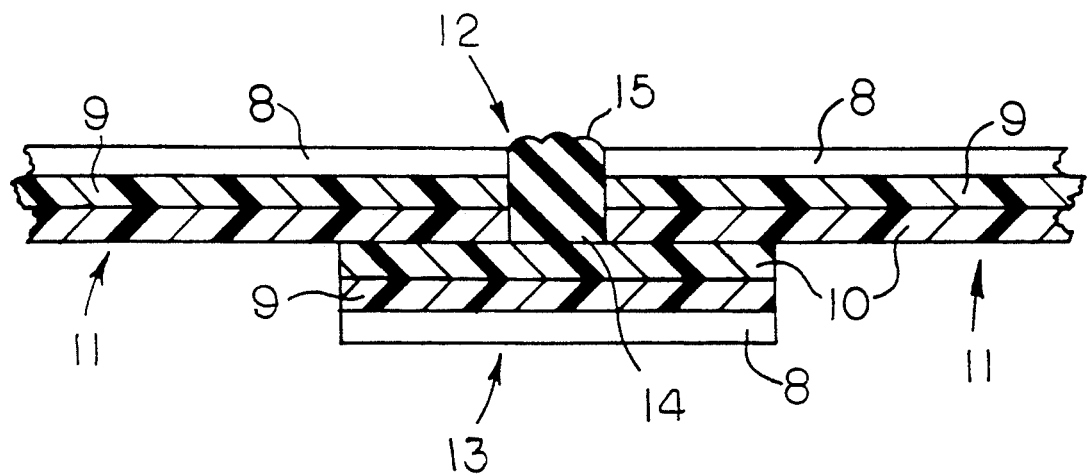
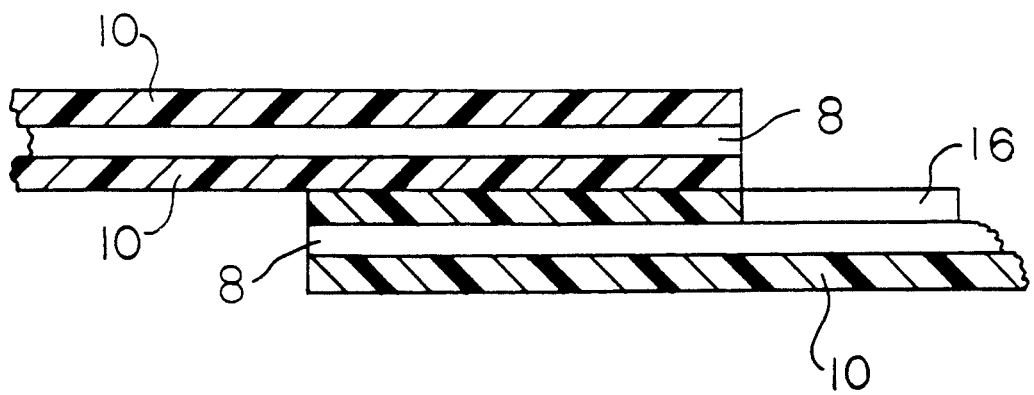

WEATHERABLE MONOLITHIC COVERINGS

This is a divisional of copending application Ser. No. 07/319,105 filed on Mar. 6, 1989, now U.S. Pat. No. 5,093,171.

FIELD OF INVENTION

This invention deals with a process to manufacture weatherable monolithic composite membranes. The method referred to herein is unique to the industry. The process comprises in general, the use of specific hard-to-bond composite materials, to give weatherable monolithic coverings which have many uses.

For example, in the roofing industry, there have been used many single ply roof covers to fabricate large roof coverings to prevent the entry of water and to keep out the elements in general. The single ply roofing covers however suffer from the fact that they are not typically strong enough to withstand the constant barrage of wind, rain, snow, and the like, and because they are single ply, they are subject to pinholes which allow the entry of water which destroys the underlaying substrates and the apparatus that is used to secure them in place. The problem of pinholes can be overcome by using more than one ply, so that the pinholes are not lined up and therefore do not create a porthole for entering water. The problem of strengthing the single ply coverings can be overcome by the use of laminates wherein at least one center ply is a reinforcing layer such as a fibrous material, and in fact, it would seem natural to laminate a weatherable ply to a reinforcing ply, or two or more weatherable plys to a reinforcing ply to overcome the problems of strength, weatherability and extant pinholes.

Such is the case where the covering can be applied in one monolithic piece, so that there does not exist seams, edges, corners and other such configurations that have to somehow be bonded or fused to maintain the continuity of the covering and render it a monolithic piece. Most of the uses for the membranes do however have the ever present problem of seams, edges, corners and other such configurations and thus there is a need to have a process that can truly create a monolithic membranous covering, especially in the roofing industry and in pipe coatings.

The inventive processes herein are such processes and these processes depend primarily on the composites that are being used to form the covering. The concept of laminating similar materials or dissimilar materials to each other in order to gain synergistic overall benefits from the combinations is not unique. The development of laminates to improve the overall properties is designed to eliminate some of the weaknesses of each without compromising the strengths of each. In one mode, this has been attempted in the industry by physically blending polymers, or coreacting polymers before the laminates are prepared, but this often leads to poorer materials because the overall effect is to compromise the important physical properties of each of the polymers.

For example, obtaining a durable, weatherable membrane for roofing applications is very difficult by the aforementioned polymers route because the properties of the combined polymers are averaged to the extent that the weatherability of one polymer, for example, is decreased when other polymers are added to the combination to enhance the fusibility of the polymers when they are used as films or coverings.

Thus, lamination is a favorite mechanical approach for using the best properties of each membrane type i.e. thermoset plastic materials which are generally weatherable, but not fusible, and, thermoplastic plastic materials which are generally not weatherable, but are highly fusible. The inventor herein intends to use the words "bond", "bonded", "bondable", and the like to indicate the broader meaning of bonding materials together, such as gluing, caulking, welding, fusing, and the like, and to use the words "fuse", "fusing", "fusible", and the like to indicate the melting together of meltable materials to form a physical bond. To date, the most common method to bond the thermoset plastics is to do it in a manufacturing unit in a plant, where high pressures, high temperatures, complex glues and the like, are more readily available, used, and handled. Those skilled in the art necessarily recognize that extreme weatherability can be obtained on a single ply thermoset polymeric material, but that thermosets cannot be readily fused, nor bonded by using the plant manufacturing conditions out in the field and thus, there is no good method usable in the field by which to create a roof covering because seams, edges, corners, and the like are inherently part of creating such a roof covering and bonding the weatherable thermosetting materials to create seams, edges, corners, etc., is a real problem.

The inventive process herein provides a superior product that maintains the excellent weatherability of the thermoset and takes advantage of the fusibility of the thermoplastic to provide a synergistic result.

BACKGROUND OF THE INVENTION

The applicant is aware of several prior art references dealing with membranous coverings, especially those dedicated to roof coverings.

For example. U.S. Pat. No. 1,774,858, issued Sep. 2, 1930 to R. Vorbau deals with a thermoplastic to thermoplastic bonding to provide a continuous covering. The bonding is done by using a repair ribbon which melts into the abutted seams of the adjoining thermoplastic segments. This method does not deal with laminated thermoset or thermoplastic layers, but deals with the gluing of layers of fabric together using a bonding resin, wherein the bonding resin impregnates the fabric and creates a physical hold.

U.S. Pat. No. 2,367,725, issued Jan. 23, 1945 to G. Lindh et al is a method for joining thermoplastic materials using hot air melting of thermoplastics including using a meltable mass of like material as the "extra glue". It should be noted that these materials are not weatherable, and there is no teaching in that reference as to how one would make such materials weatherable. Further, the Lindh et al method does not deal with laminates of dissimilar materials, and the problems associated with bonding therein. This reference discloses the top cap method and the overlap method of seaming single ply materials.

An additional reference showing welded polymeric articles is U.S. Pat. No. 3,927,233. issued to Robert J. Naidoff on Dec. 16, 1975 which discloses butt-welded polymeric articles. It deals with bonding like substrates to like substrates. It does not deal with bonding unlike substrates to each other, nor does it deal with laminated structures at all. The essence of the invention is the use of a curable polymeric plug which can be inserted between the various segments of the polymeric sheets and then compressed, heated and cured to bind the polymeric sheets together.

In U.S. Pat. No. 4,563,379, issued Jan. 7, 1986 to Gerhard Kruger, there is disclosed the use of a reinforcing organic resin mixed intimately with the thermoset resin which causes the thermoset to bind together upon heating, by forming an interpenetrating network non-crosslinked thermoset which does not depend on a chemical cure.

Finally, there is U.S. Pat. No. 3,071,503, issued Jan. 1, 1963 to J. R. N. Dubois, which is included herein as a reference showing the many types of seams and bonds that are needed to form membranous coverings, but of course, not with the materials and methods of the instant invention.

Thus, it appears that the instant invention has not been disclosed in the prior art and the advantages of the instant invention are not suggested by the prior art and are therefore not obvious to those skilled in the art.

THE INVENTION

The methods and the unique composites of the instant invention overcome the problems of the prior art processes and materials to provide essentially maintenance free, weatherable, unitary coverings for a variety of substrates, especially, roofs and pipes.

The composites of the instant invention have the advantage that hard to bond weatherable materials can be solidly bonded on the job site without the need for expensive, equipment, and with a minimum of effort to give weatherable unitary coverings.

Thus there is provided a method of seaming polymeric composite pieces to form a unitary cover which is impervious to the weather, the method comprising (I) assembling one or more pieces of a bonded composite covering to form a narrow seamable opening, wherein each piece of bonded composite covering has at least a weatherable polymeric thermoset layer and a plymeric thermoplastic layer; (II) contacting the pieces of said bonded composite covering, on the side of the polymeric thermoplastic layer not contacting the weatherable polymeric thermoset layer, along the entire length of the line of the narrow seamable opening, with a polymeric thermoplastic tape having essentially the same thermoplastic polymeric composition as the polymeric thermoplastic layer; (III) fusing said tape to the polymeric thermoplastic layer by a suitable means to form a narrow seamed channel along the entire length of the narrow seamable opening, and (IV), filling said narrow seamed channel with a filler impervious to the weather, whereby a unitary cover, impervious to the weather, is formed.

There is also provided by this invention, articles which are formed by the aforementioned method, which articles are generally unitary in nature, and weather impervious such as, for example, roof and pipe coverings.

Further, there is provided a composite which comprises at least one layer of thermoplastic material and at least one layer of thermoset material bonded together.

Still further, there is provided a composite article which comprises at least tow thermoplastic layers which are bonded together with a thermoset layer therebetween.

Finally, there is provided a method of seaming polymeric composite pieces to form a unitary cover which is impervious to the weather, the method comprising (I), assembling one or more pieces of a bonded composite covering as set forth above, which comprises at least two thermoplastic layers which are bonded together with a thermoset layer therebetween to form an overlapping joint, and then (II), fusing said pieces to each other by a suitable means to form a unitary covering.

A final objective of this invention is to provide a composite sheet of material that can be used such that cutting, fitting, gluing, and the like, are provided to form a unitary roof covering without the commensurate problems associated with the prior art methods.

It should be understood by those skilled in the art that the composites the processes of this invention can be used to provide repair to already existing coverings and there is therefore provided herein methods by which such repairs can be undertaken.

BRIEF DESCRIPTION OF THE DRAWINGS

The invention will now be described with reference to the accompanying drawings, which are illustrative of the embodiments of the invention falling within the scope of the appended claims, and in which:

FIG. 7 is a sectional side view of one specific overlap arrangement provided by the composites and methods of this invention.

FIG. 8 is a sectional side view of a novel arrangement using composites which have a fugitive layer bonded to them.

DESCRIPTION OF THE PREFERRED EMBODIMENTS

Turning now to the Figures, there is shown in each figure a bonding material 1 which is common to all of the FIGS. 1 to 6 for purposes of illustrating this invention, and comparing it to the prior art, it being understood that glue bonding and heat welding and other means of bonding and fusing the layers of the composite can be used in the instant invention, fusing being the preferred mode of bonding used to form the weather impervious monolithic coverings of the invention herein. The layered material shown in FIGS. 1 to 6 is illustrated as single ply, also for purposes of comparing and illustrating the instant invention. Also in FIGS. 1 to 6, the covering materials are shown as 2.

Figure 1:
FIGS. 1 through 6 show sectional edge views of the various arrangements that can be used to create seams, edges, corners, and the like, it being understood that such arrangements are shown as single plys and that these figures as single plys are not considered to fall within the scope of the instant invention, but are shown for illustration purposes and, such arrangements can be manufactured by the materials and methods of the instant invention.

FIG. 1 illustrates the overlap seam, wherein the covering material is shown as partially overlapping an adjacent piece of covering material.

Figure 2:
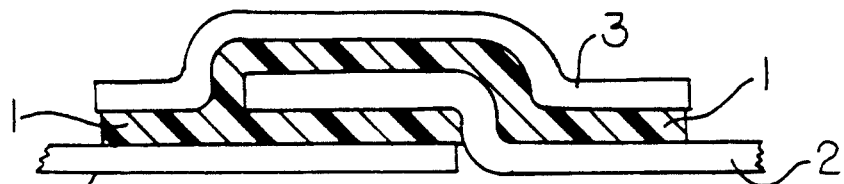

FIG. 2 illustrates the overlap seam which also contains a top cap 3.

Figure 3:
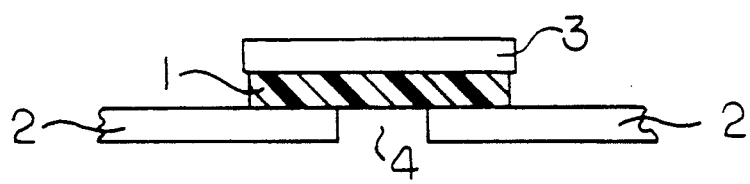

FIG. 3 illustrates a top cap over an abutted joint 4, said abutted joint having no filler material therein.

Figure 4:
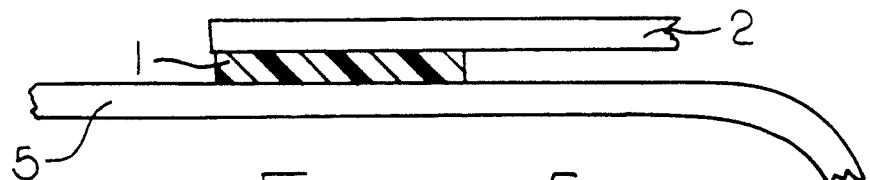

FIG. 4 illustrates an overlap seam wherein the bottom layer of material 5 is extended beyond the normal overlap to accomodate fastening devices which may be used to help hold the coverings to the substrate.

Figure 5:
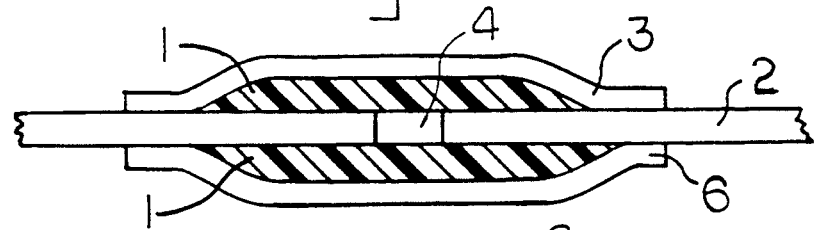

FIG. 5 illustrates the top cap 3 and the reverse cap 6 in combination on an abutted joint 4, which abutted joint has no filler material as shown.

Figure 6:
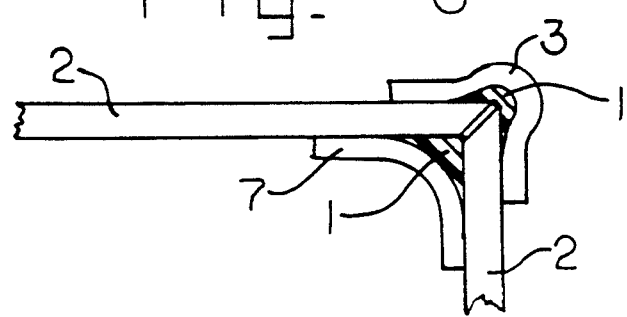

FIG. 6 illustrates a corner joint using an inside cap 7 and a top cap 3 against a biased abutted joint.

FIG. 7 illustrates a segment of an article of this invention wherein there is shown composite materials placed together to form a seam by the method of this invention wherein there is shown two composite top pieces and one composite bottom piece, each piece comprising a layer of thermosetting material 8, which will be recalled is weather impervious, and which is illustrated as the top layer in the top pieces in this figure. The thermoset layer 8 surmounts and is bonded to a reinforcing layer 9 which can be selected from such materials as felts, scrim, glass fibers, polyester films, and the like. The reinforcing layer 9 need not be weather impervious, it need only supply reinforcement to the laminate and strengthen it. The reinforcing layer 9 is bonded to the thermoset layer 8, usually by gluing the two together in the manufacturing plant. The bottom layer of the top piece illustrated in FIG. 7 is a thermoplastic plastic layer 10, which it will be recalled, is generally not weatherable, but is readily fusible, especially to other readily fusible thermoplastics.

The bottom thermoplastic layer 10 of the top piece is also bonded together with the reinforcing layer 9, on the side opposite the thermoset layer 8, such that the whole forms a composite 11, it being understood that this composite product is manufactured in a plant, using the conventional equipment and tooling to enhance the bond of the layers to each other, and is supplied to the work site in large rolls. It should also be understood that there can be more than one layer of each type of material bonded into the composite 11 to accomodate the specific end-use application that the material will be used for. For example, it is within the scope of this invention to laminate two thermoset layers 8 to each other as the top layer, so that the problem of pinholes is avoided or essentially reduced. Further, it is within the contemplation of the inventor herein to bond one or more reinforcing layers 9 into the composite 11, or to bond two or more different types of reinforcing layers 9 into the composite 11 to enhance the strength and bonding capabilities of the reinforcing layers 9 to the other layers.

As shown in FIG. 7, two pieces of the composite 11 are brought together in a butt joint 12 to form the seam used to bind the pieces together. In practice, this butt joint 12 is brought together as tightly as possible, but owing to the courseness of the edge of the composite, there is practically always a narrow opening 14 between the edges of the composite which in FIG. 7 is exaggerated for purposes of illustration.

The critical part of this invention is now brought into play by the placement of the bottom piece of the seam, i.e. the bottom cap 13, which is simply an additional piece of the laminate 11, placed against the butt joint 12 with the thermoplastic side 10 of the composite 11 against the thermoplastic side 10 of the composite 11 on the top of the seam which gives a fusible interface. Then, the narrow opening 14 is filled with a weather impervious material such as a caulk 15 or the like to cover the exposed thin strip of thermoplastic in the narrow opening 14.

In practice, one of the inventive methods, and the most preferred method used in this invention is referred to as the "reverse cap" process and is used, for example, in the formation of a weather impervious roof, which comprises assembling sheets of composite material of this invention on a surface to be covered with a weather impervious covering; arranging the sheets of the composite material such that their edges are adjacent and abutted to each other over the length of the sheets; placing a narrow strip of the weather impervious covering wide enough to overlap the edges of the sheets of the weather impervious covering, underneath the edges to be seamed, and parallel with the abutted edges; heating the seamed edge along its entire length to fuse one of the thermoplastic layers 10 to the seaming strip to form a tongued configuration, and then, heating the second sheet along its entire length to fuse it with the tongue thus formed, and then, filling any narrow opening 14 left by such seaming, with a weatherable caulk 15.

With reference to the FIGS. 1 to 6, it is apparent that the composites of the instant invention can be used to substitute for the single plys of the various seams of those prior art figures, and with reference to the above general method for obtaining monolithic weather impervious coverings, those various seams, among others, when manufactured by the process of the instant invention, are considered to fall within the contemplation of the inventor herein and are therefore considered within the scope of the claims appended hereto.

Thus, by way of example, and with reference to FIG. 3, it is within the scope of this invention to top cap the seam rather than reverse cap the seam using the inventive composites of the instant invention, it being understood that the seam provided by this method, eventhough it is superior to the seams provided by the prior art methods, is subject to some attack by the weather because of the exposure of a small portion of the edge of the fused thermoplastic layer with the weather.

This knowledge however, can be of some benefit and in another aspect of this invention, the composite configuration can be realigned to give such a benefit. Thus, with reference to FIG. 8, the inventor herein contemplates a seaming method, and a composite used therefor, in which, as illustrated by an overlap seam, there is provided two composites fused together to form a monolithic covering, each such composite having bonded together a thermoset layer 8 between two or more thermoplastic layers, with or without a reinforcing layer (no such reinforcing layer is shown in FIG. 8 for purposes of simplifying the Figure). As in the method set forth in detail above, the method can be used for all seaming to obtain weather impervious covers and the lap seam is used for illustration purposes herein. The concept set forth in this segment of the invention relies on the fusibility of the thermoplastic layers to form the seam, with the idea that the top thermoplastic layer of the composite, whereever it is exposed to the weather, will disappear over time to leave the weather impervious thermoset layer in place. In other words, the top thermoplastic layer of the laminates is used during construction to provide the needed fusion to bond the thermoplastic covered layers together, and then, the unneeded thermoplastic layer acts as a fugitive layer 16, shown in phantom in FIG. 8, and disappears over time exposure to the weather, leaving the thermoset layer exposed to the elements. Obviously, the thermoplastic layer 10 of the top composite disappears as well, and the inventor recognizes that fact but has not illustrated that situation in FIG. 8 for the sake of simplification and clarification.

This method of forming monolithic weather impervious coverings is quick, economical, and gives those skilled in the art a weathertight covering, requiring little or no maintenance. Again, it should be understood by those skilled in the art, that the method just described, and the composites just described, can be used with the various kinds of the seams, edges, and corners, etc., that have been described throughtout this specification and claims.

Thus, what has been described in its simplest form are methods for obtaining monolithic weather impervious coverings for various substrates, and the novel composites used for that purpose.

That which is claimed is:

1. A composite which consists essentially of at least one layer of thermoplastic polymeric membrane and at least one layer of thermoset polymeric membrane fused together.

2. A composite article as claimed in claim 1 wherein at least one layer of thermoplastic polymeric membrane is fused to a reinforcing layer, and the reinforcing layer is fused to at least one layer of thermoset polymeric membrane.

3. A composite article which consists essentially of at least two thermoplastic polymeric membranes which are fused together with a thermoset polymeric membrane therebetween.

4. A composite article as claimed in claim 3 wherein at least one thermoplastic polymeric membrane is fused to a reinforcing layer, and the reinforcing layer is fused to at least one thermoset polymeric membrane.

* * * * *